Figure 1:
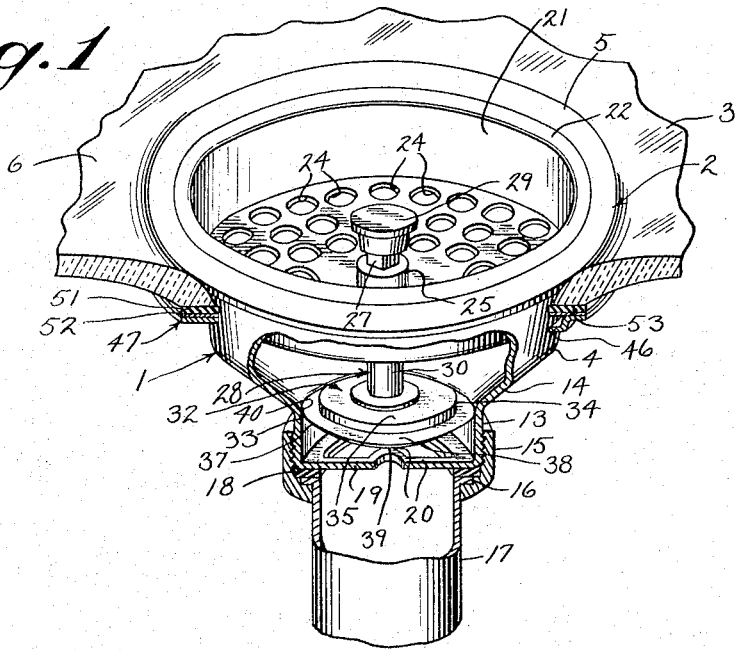

March 14, 1967  E. A. POVALSKI  3,308,484

SINK STRAINER

Filed May 5, 1964  3 Sheets-Sheet 1

INVENTOR
EUGENE A. POVALSKI

BY Arthur H. Seidel

ATTORNEY

March 14, 1967  E. A. POVALSKI  3,308,484
SINK STRAINER
Filed May 5, 1964  3 Sheets-Sheet 2

INVENTOR
EUGENE A. POVALSKI

BY
Arthur H. Seidel

ATTORNEY

March 14, 1967  E. A. POVALSKI  3,308,484
SINK STRAINER

Filed May 5, 1964  3 Sheets-Sheet 3

INVENTOR
EUGENE A. POVALSKI

BY
ATTORNEY

United States Patent Office 3,308,484
Patented Mar. 14, 1967

3,308,484
SINK STRAINER
Eugene A. Povalski, Kohler, Wis., assignor to Kohler Co., Kohler, Wis., a corporation of Wisconsin
Filed May 5, 1964, Ser. No. 365,031
5 Claims. (Cl. 4—287)

The present invention relates to a sink strainer for a drain in a sink, and more specifically the invention resides in a strainer body adapted for mounting in a drain of a sink and having a laterally extending retaining shoulder in combination with a cam lock ring fitting about said strainer body, and the cam lock ring having a cam surface adapted for engagement with said retaining shoulder to secure said strainer body to said sink; and the invention also may include a stopper for said sink strainer having a valve comprised of a central disc with a flexible annular ring about its outer periphery that engages an inside wall of said strainer body to form a watertight engagement therewith under the weight of water in said sink.

The installation of sink strainers of the prior art is a time consuming operation, usually requiring the assembly of two or more screw threaded components which serve to draw the sink strainer tightly against the upper or inner surface of the sink through the drain of the sink. By means of the present invention, it is possible to install or remove a sink strainer in a minimum time and the whole operation requires little, or no training and few if any tools. This is accomplished by means of a cam lock ring which fits about the outside of a strainer body and which has inwardly extending inclined surfaces to bear against projections extending outward from the strainer body to draw the strainer body tightly into position in a sink drain.

The present invention also provides a new improved stopper for a sink strainer. The prior art, as illustrated by Patent No. 2,890,463, considered the application of a positive force necessary to achieving an effective valve or stopping action in a sink strainer. The stopper of the present invention is designed to utilize only the pressure of the weight of the water on top of it to effect a watertight seal. This invention provides a feather edged valve which bears against an annular seat formed on the inside surface of a strainer body and which deforms under pressure to form the requisite watertight seal with the seat. The feather edge is created by an annular sealing ring around a central disk. The sealing ring is flexible and has a lower surface which tapers upwardly and outwardly to meet the upper surface at the outer periphery of the ring, so that its flexibility increases toward its outer periphery.

Accordingly, it is an object of the present invention to provide a sink strainer which may be rapidly assembled in the drain of a sink.

It is an other object of the present invention to provide a sink strainer which may be rapidly and easily disassembled from the drain of a sink.

It is another object of the present invention to provide an improved stopper for a sink strainer which utilizes the weight of the water on top of it to provide force necessary to create a watertight seal.

It is another object of the present invention to provide a sink strainer which may be rapidly and easily assembled and disassembled in the drain of a sink with a minimum number of tools and requiring the minimum amount of skill.

The foregoing and other objects will appear in the description to follow. In the description, reference is made to the accompanying drawings which form a part hereof and in which there is shown by way of illustration a specific embodiment in which this invention may be practiced. This embodiment will be described in sufficient detail to enable those skilled in the art to practice this invention, but it is to be understood that other embodiments of the invention may be used and that structural changes may be made in the embodiment described without departing from the scope of the invention. Consequently, the following detailed description is not to be taken in a limiting sense; instead, the scope of the present invention is best defined by the appended claims.

Figure 2:
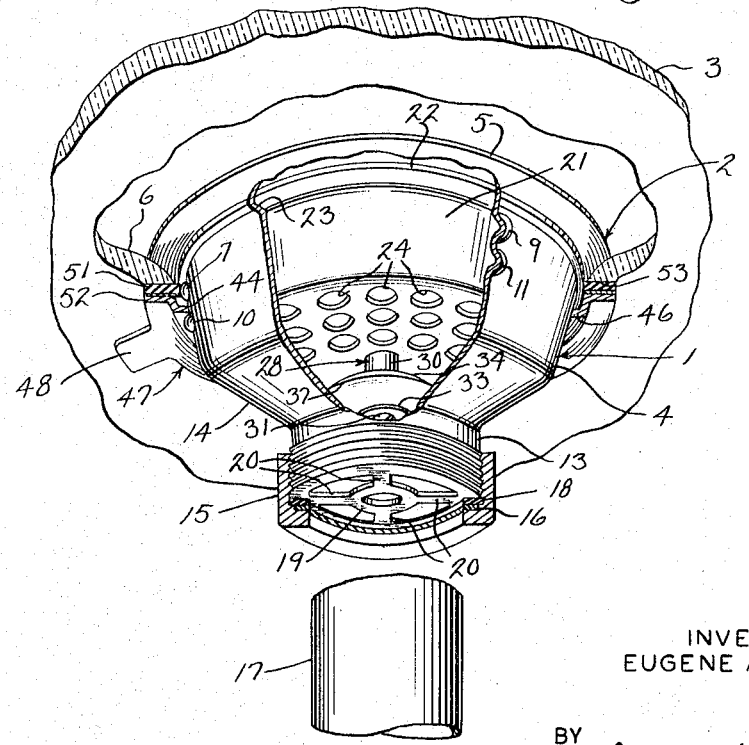
Figure 3:
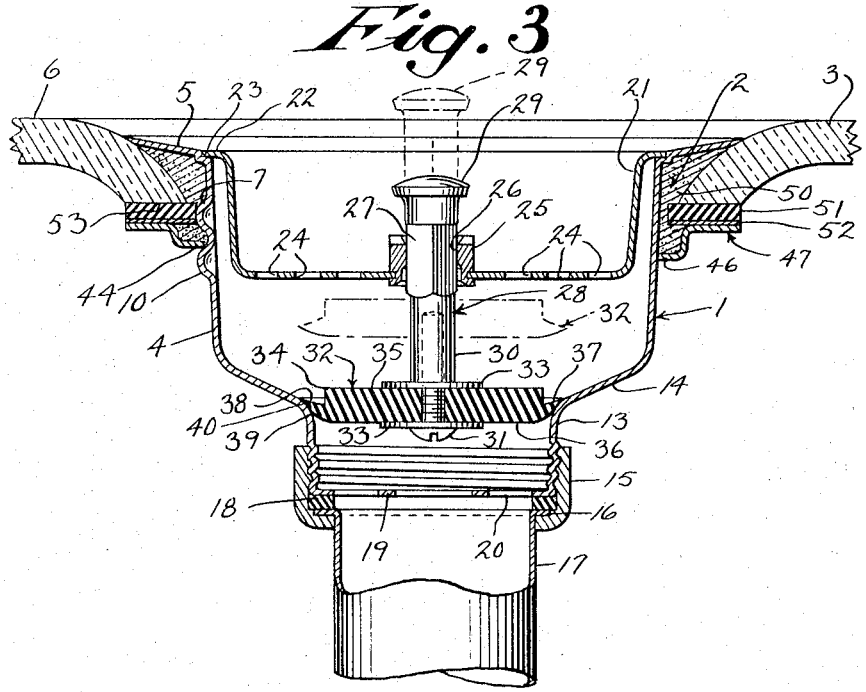
Figure 4:
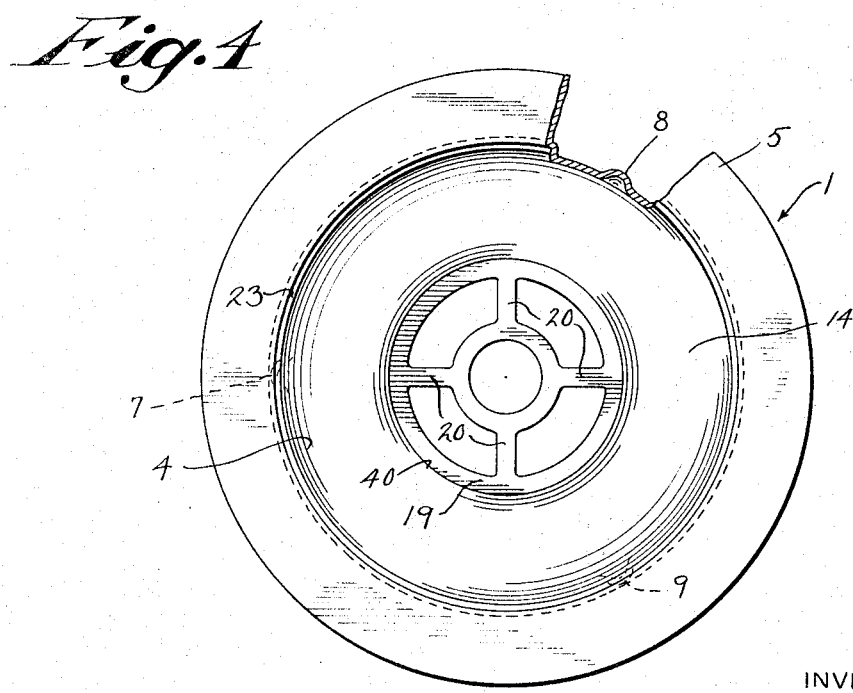
Figure 5:
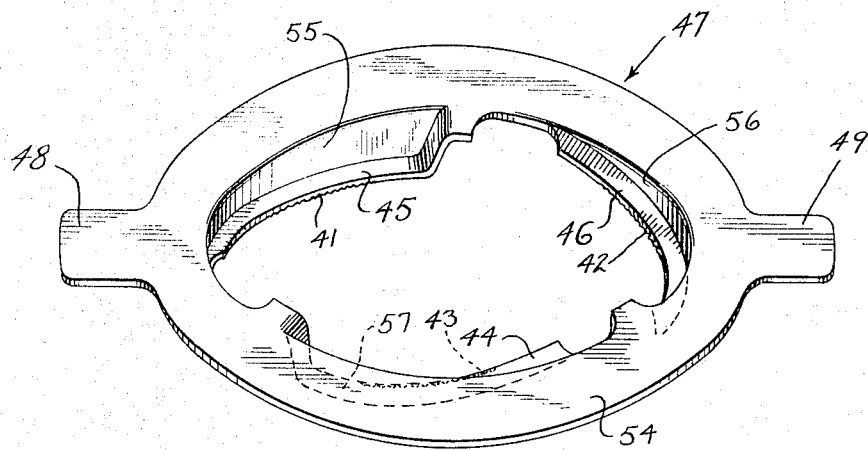
Figure 6:
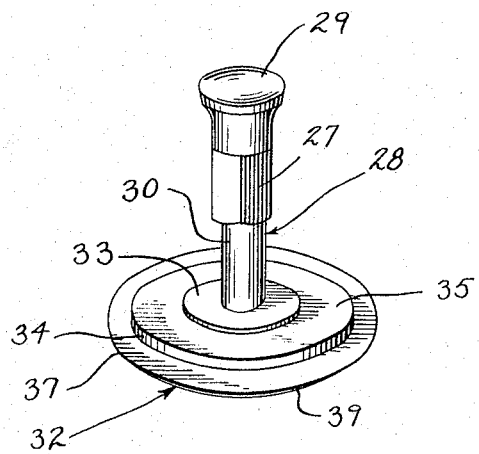

In the drawings:

FIG. 1 is a view in perspective of a sink strainer embodying the present invention with portions broken away to illustrate its interior, FIG. 2 is another view in perspective of the embodiment of the present invention shown in FIG. 1, again with portions broken away to illustrate the interior structure, FIG. 3 is a side elevation in section of the embodiment of the present invention illustrated in FIGS. 1 and 2, FIG. 4 is a top plan view of a strainer body from a sink strainer embodying the present invention, FIG. 5 is a view in perspective of a cam lock ring from the embodiment of the present invention illustrated above, and FIG. 6 is a view in perspective of a stopper embodying the present invention.

Referring now to the drawings, and particularly to FIGS. 1, 2 and 3, thereof, there is shown a sink strainer embodying the present invention that has a metal strainer body 1 adapted by its structure for mounting in a drain opening 2 of a sink 3. The strainer body 1 may be a stainless steel or chrome steel, or some other suitable material, and the sink 3 can be relatively thick as shown in the drawings, or it can be of thinner cross section as in the instance of a steel sink. The strainer body 1 has a cylindrical cup portion 4, and an annular flange 5 extending radially outward and slightly upward from the top edge of the cup portion 4 to bear against an upper surface 6 of the sink 3 about the drain 2. Three retaining shoulders 7, 8 and 9 are stamped in the wall of the cup portion 4 at evenly spaced intervals about the circumference of the wall to project outwardly towards the drain 2, and in the particular instance of a thick sink as illustrated they may function to center and properly position the strainer body 1 in the drain 2. When the sink strainer is used in a thin walled sink the shoulders 7, 8 and 9 function as retaining shoulders in a manner hereinafter described. Just beneath the shoulders 7, 8 and 9 is a set of three additional retaining shoulders, also in the form of outwardly projecting nubs stamped in the wall of the cup portion 4 of the strainer body 1. This second set is utilized when the sink strainer is installed in a thick walled sink as illustrated, and two of this second set are identified in FIGS. 2 and 3 by the numerals 10 and 11.

At the lower end of the strainer body 1, beneath the cup portion 4, is a constricted throat portion 13, the top edge of which flanges outward to form a bottom 14 of the cup 4. The throat portion 13 is threaded at its lower end to engage a slip nut 15, which captures a flared top end 16 of a tailpiece 17. A rubber washer 18 is clamped between the flared top 16 of the tailpiece 17 and the bottom of the throat portion 13 of the strainer body 1 to form a watertight junction of the tailpiece 17 and the strainer body 1 when the slip nut 15 is tightened. The bottom of the throat portion 13 of the strainer 1 has a central ring 19 with four radially extending spokes 20 to trap debris which might otherwise clog the tailpiece 17.

A removable, metal refuse basket 21 has its upper edge bent outward to form a laterally extending rim 22 which rests on a shoulder 23 formed on the inner wall of the strainer body 1 to support the refuse basket 21. The bottom of the refuse basket 21 is penetrated by a number of holes 24 large enough to permit a rapid flow of water through the basket 21 and small enough to trap refuse which might obstruct the drain pipe 17. A bushing 25 is mounted through the center of the refuse basket 21, and in the particular form illustrated it has a polygonal central opening 26 to receive a polygonal upper portion 27 of a metal stopper stem 28. On top of the stopper stem 28 is a knob 29, and beneath the polygonal upper portion 27 is a cylindrical lower portion 30. A tapped hole concentric with the lower cylindrical portion 30 is formed in the bottom end of the stopper stem 28 to receive a stopper mounting screw 31.

A rubber or plastic valve 32 is secured to the bottom of the stopper stem 28 by the mounting screw 31 through a pair of washers 33 on either surface of the valve 32. The valve 32 has a comparatively rigid central circular disc portion 34 which has a flat top 35 and a flat bottom 36. Extending radially from the periphery of the disc 34 is an annular sealing ring 37, which forms what is referred to as a "feather edge" on the valve 32. The sealing ring 37 has a substantially flat upper surface 38 which is recessed below the top 35 of the central disc 34, and the sealing ring 37 has an upward and outward tapering lower surface 39 which, along its inner edge, is flush with the bottom 36 of the central disc 34, and which tapers upward from there to meet the flat upper surface 38 of the sealing ring 31 at the outer periphery of the sealing ring 37. Since the sealing ring 31 is made of rubber or other similarly elastic flexible material and since it is thin compared to the central disc portion 34, it is readily deformable under the weight of the water on top of the valve 32 and it is therefore able to form a watertight seal with a seat 40 which is formed on the inner surface of the bottom 14 of the cup 4, where the bottom 14 meets the constricted throat portion 13 of the strainer body 1. The comparative rigidity of the thicker central disc portion 34 prevents the valve 32 from collapsing under strain or weight of water on the stopper.

On the outer surface of the strainer body 1, the three retaining shoulders 7–9 and the three retaining shoulders 10–11 define two levels of bearing surfaces which form part of the novel mounting means for the strainer embodying the present invention. Each set is adapted to receive and engage inclined cams 44, 45 and 46 which project inwardly from a steel cam lock ring 47, shown in perspective in FIG. 5. The cam lock ring 47 has a flat, upwardly facing, circular bearing surface 54 and an open center, so as to encircle the cup portion 4 of the strainer body 1. The cams 44, 45 and 46 are circumferentially spaced around the inside of the circular bearing surface 54 and are integrally connected therewith by vertical stiffening webs 55, 56 and 57. The cams 44, 45 and 46 are rigidly held in position by the webs 55, 56 and 57, so their under surfaces make sturdy bearing contact with either the three retaining shoulders 10–11 or in the alternative the three shoulders 7–9. The under surfaces of the cams 44, 45 and 46 have serrations 41, 42 and 43 that ride over the shoulders and increase the resistance to relative movement between the cams and the shoulders. The cam lock ring 47 also has ears 48 and 49 projecting radially outward from opposite sides to serve as levers to receive rotational forces exerted in the assembly of the cam lock ring 47 onto the strainer body 1.

The installation of a strainer of the present invention is a comparatively quick and easy operation. First, a layer of putty 50 is deposited on the upper surface 6 of the sink 3 around the drain 2, as is conventionally done. Then the strainer body 1 is dropped through the drain 2 so that its flange 5 rests on the top surface 6 of the sink 3. A rubber gasket 51 and a fiber friction washer 52 are placed around the cup portion 4 of the strainer body 1 against an under surface 53 of the sink 3. The cam lock ring 47 is then slipped over the retaining shoulders 10–11 on the cup portion 4 of the strainer body 1 and turned in a clockwise direction to have the serrations 41, 42 and 43 ride over the retaining shoulders with a wedging action due to the incline of the cams 44, 45 and 46. The ears 48 and 49 may be tapped lightly several times with a hammer, causing the cams 44, 45 and 46 to bear down tight against the shoulders 10–11 and the bearing surface 54 to work tightly against the fiber washer 52. This also draws the flange 5 tightly against the upper surface 6 of the sink, so that the strainer body 1 will be firmly mounted on the sink 3 with a watertight seal between the flange 5 and the upper surface 6 of the sink 3. The tailpiece 17 is then connected to the bottom of the throat portion 13 of the strainer body 1 in the conventional manner, using the slip nut 15 and the rubber washer 18. It is also apparent from the foregoing discussion, that when the sink strainer is used in a thin sink the set of retaining shoulders 7–9 will be engaged by the serrated cams 44, 45 and 46, so that the strainer can accommodate sinks of varied construction.

To permit water to flow through the strainer, the knob 29 on the stopper stem 28 can be lifted upward until the polygonal upper portion 27 of the stopper stem 28 has cleared the bushing 25 in the refuse basket 21. The knob 29 may then be rotated a short distance so that the edges of the polygonal upper portion 27 of the stopper stem 28 rest over the tops of the flat portions of the polygonal central opening 26 and the bushing 25. To stop the flow of water from the sink, it is necessary only to rotate the knob 29 on the stopper stem 28 until the corners of the polygonal upper portion 27 of the stopper stem 28 coincide with the corners of the polygonal central opening 26 in the bushing 25, permitting the polygonal upper portion 27 to drop into the bushing 25. In this position, the interaction of the polygonal central opening 26 in the bushing 25 cooperates with the polygonal upper portion 27 of the stopper stem 28 so that the valve 32 is accurately centered over the valve seat 40. The weight of the water accumulating on top of the valve 32 and forcing it downward against the valve seat 40 will be sufficient to deform the feather edge of sealing ring 37 so that its tapered lower surface 39 forms a secure, watertight seal with the valve seat 40.

The construction of the mounting elements of the sink strainer described is economical and the relative ease of mounting is manifest. Also, the stopper action in the sink strainer is very desirable, for a watertight seal is readily attained with a very simple manipulation of turning the knob 29. It will be apparent to those skilled in the art that many of the details of construction in the preferred embodiment described above may be altered while retaining the essential concept and advantages of the present invention.

For example, the polygonal upper portion 27 of the stopper stem 28 and the polygonal central opening 26 of the bushing 25 are shown to be symmetrically hexagonal, but clearly there is no requirement for symmetry or any particular number of sides. In fact, a cylindrical stem with projections having complementing configurations in the shape of the central opening in the bushing would also serve, and the term "polygonal" is therefore understood to include these and any other such regular or irregular shapes performing the described functions. Similarly, the strainer body 1 and the refuse basket 21 and the various other components of the assembly are generally made of stamped stainless or chrome steel, but obviously any corrosion resistant material of appropriate structural strength may be used. The retaining shoulders 7–9 and 10–11 may be riveted attachments or elongated cam surfaces over which simple projections on the lock ring 47 may ride. Also, the configurations of the refuse basket 21, and the strainer body 1 shown in the preferred embodiments represent only one of many possible shapes. The foregoing suggestions do not exhaust the possible variations. Therefore, the scope of this invention is not to be deemed limited by the structure described, but rather is set out in the claims which follow.

I claim:
1. In a sink strainer, the combination comprising a strainer body having a cup portion, a circumferential supporting flange extending laterally outward from its top to bear downward against an upper surface of a sink, a constricted throat portion at its lower end adapted for connection to a tailpiece, and a retaining shoulder on its lateral surface;

and a cam lock ring adapted to fit around said strainer body and to bear upward against a lower surface of said sink, and having a cam surface engageable with said retaining shoulder on said strainer body, to bear downward against said retaining shoulder to tightly secure said strainer body to said sink when it is assembled with said strainer body.

2. In a mounting for a sink strainer, the combination comprising a strainer body having a circumferential flange extending laterally outward from its upper edge to bear downwardly on an upper surface of a sink about a drain hole, and a retaining shoulder projecting outward from its side;

and a cam lock ring fitting loosely about said strainer body and adapted to bear upwardly against a lower surface of said sink about said drain hole, having a cam surface engageable with said retaining shoulder to bear downwardly against said retaining shoulder when assembled with said strainer body, and having laterally extending ears to receive rotational force for assembly and disassembly of said cam lock ring on said strainer body.

3. In a strainer for a drain in a sink, the combination comprising:

a cylindrical strainer body having a circumferential flange extending laterally from its upper end to bear downwardly against an upper surface of a sink about a drain in said sink, a constricted throat portion at its bottom end adapted for watertight engagement with a drain pipe, a plurality of projecting shoulders extending laterally outward from said strainer body, at different levels to provide multiple sets of retaining shoulders extending laterally outward from said strainer body that are employed in the alternative for sinks of different thickness;

and a cam lock ring encircling and fitting loosely around said strainer body, having downwardly facing cam surfaces projecting inward to engage said retaining shoulders and bear downward thereagainst, an outwardly projecting ear to receive rotational force for moving said cam surface against said shoulders, and adapted to bear against an under surface of said sink about said drain when said cam lock ring is assembled on said strainer body.

4. In a sink strainer, the combination comprising:

a strainer body with a cup shaped portion adapted to fit within a sink opening that necks down at its lower end into an outlet which forms a valve seat, and having an outward flaring circumferential flange at its top for engaging a sink;

a cam lock ring encircling said strainer body with a bearing surface for engaging the underside of a sink; and a cam surface and retaining shoulder cooperative with one another on said cam lock ring and strainer body which urge the cam lock ring upward upon a turning of the cam lock ring.

5. A sink strainer in accordance with claim 4 in which said cam surface is serrated to resist relative turning between said cam surface and said retaining shoulder.

References Cited by the Examiner

UNITED STATES PATENTS

| 2,736,040 | 2/1956 | Mackey | 4—287 |
| 3,060,459 | 10/1962 | Smith | 4—295 |
| 3,104,400 | 9/1963 | Lantz et al. | 4—287 |

FOREIGN PATENTS

| 133,456 | 7/1949 | Australia. |

LAVERNE D. GEIGER, Primary Examiner.

H. J. GROSS, Assistant Examiner.